Feb. 7, 1939.  L. W. EGGLESTON  2,146,696

VALVE

Filed June 12, 1935

INVENTOR
Lewis W. Eggleston
BY
his ATTORNEY

Patented Feb. 7, 1939

2,146,696

UNITED STATES PATENT OFFICE 2,146,696

VALVE

Lewis W. Eggleston, Detroit, Mich., assignor to Detroit Lubricator Company, Detroit, Mich., a corporation of Michigan Application June 12, 1935, Serial No. 26,141

6 Claims. (Cl. 236—64)

My invention relates generally to valves and more particularly to vent valves.

It is one of the objects of my invention to provide a new and improved vent valve structure which, among other uses, is particularly suitable for the venting of air from the line of a heating system, and to provide a vent valve for this purpose which, while being highly efficient in preventing the escape of the heat conveying medium from the line, has a large capacity for the egress of air therefrom so as to facilitate the even distribution of the heat conveying medium to the various heat radiating units of a heating system.

Another object of my invention is to provide a vent valve structure of the above-mentioned character having a new and improved arrangement of the operating and cooperating parts.

Another object of my invention is to provide a new and improved vent valve structure of the vacuum type and which has a large capacity for the egress of air while yet being efficient in preventing the ingress of air to the heating system line.

Another object of my invention is to provide a vent valve having a new and novel valve seat structure and cooperating valve means.

The invention consists in the improved construction and combination of parts to be more fully described hereinafter and the novelty of which will be particularly pointed out and distinctly claimed.

In the accompanying drawing, to be taken as a part of this specification, I have fully and clearly illustrated my invention, in which drawing—

Figure 1:
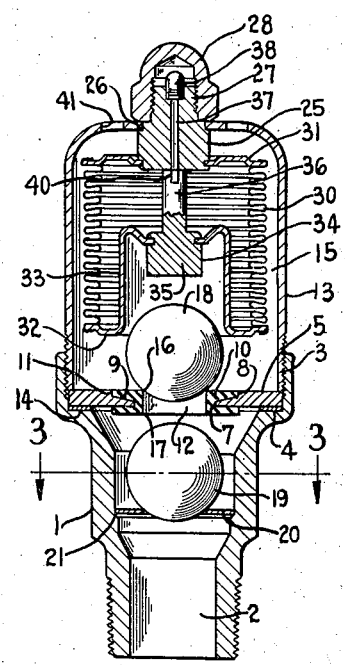
Figure 1 is a view shown in cross-section taken longitudinally through my improved vent valve.

Referring to the drawing by characters of reference, my vent valve structure includes a housing or casing which is sectional in construction and which includes a body 1 which is preferably tubular in shape. The body 1 has a central passageway longitudinally therethrough and the lower end of the body 1 constitutes the inlet end and is preferably externally threaded for connection in the line of a heating system. The inner wall of the body 1, and which defines the passageway therethrough, is preferably circular in contour or cross section and is formed by a number of different size concentric bores including a bore 2 which leads into the body from the heating system line. The upper end of the body 1 has a bore 3 of relatively larger diameter and which leads out of the upper end thereof and provides an upwardly facing annular shoulder or seating surface 4. Mounted on the seating surface 4 there is a valve seat member which includes, in this instance, a supporting means which may be a ring-shaped plate 5, an outer circumferential border portion of which contacts with the annular seating shoulder 4. The plate 5 has a centrally disposed opening 7 therethrough which may be circular in shape, and the upper wall of the plate is preferably provided with a counterbore 8 concentric with bore 7 and forming a recessed wall 9. The recessed wall 9 preferably tapers downwardly from bore 8 to bore 7 and around its entire periphery. A valve seat member 10 is carried by the plate 5 and is preferably constructed of a resilient material, such as rubber, or a rubberized material or any other suitable resilient material. The material of the resilient valve seat member 10 is preferably molded to the plate 5 and around the edge of the plate defining the opening therethrough and disposed in the counterbore 8 with the top face of the seat being flush with, or in the same plane as, the top surface of the supporting plate 5. On the underside of the plate 5 the resilient material is formed in the shape of an external annular flange, as at 11, which is molded to the plate. The valve seat member 10 is provided with a centrally disposed opening or aperture 12 which is preferably circular in shape and which constitutes the port through which air passes and which is closed to the passage of the heat conveying medium, and of water or other fluid than air.

Mounted on the upper end of the body 1 there is a casing or cap 13 which is preferably a shell-like cap of tubular form. The inner wall of the portion 3 of enlarged diameter of the body 1 may be threaded, and the cap 13 may be externally threaded for screw-threading thereinto. If desired, the cap 13 may also be employed to clamp the valve seat structure tightly against its seating shoulder 4 by threading the cap into the body 1 so that its inner end engages with a circumferential border portion of the plate 5, as shown, or the valve seat structure may be held in any other suitable manner. Preferably a washer or gasket of suitable material is clamped between the supporting plate 5 and the annular seating shoulder 4, as at 14.

The valve seat structure divides the interior of the sectionally constructed casing into two chambers, communicable through its port 12, comprising the inlet chamber or passageway in the body 1 and a chamber 15, or outlet chamber, within the cap 13. The resilient valve seat member 10 has a valve seat 16 on its top wall and also a valve seat 17 on its underside, the valve seats 16 and 17 being adapted for cooperating with valve members 18 and 19, respectively, for controlling flow through port 12. The ball valve members are preferably loosely disposed in the casing and the ball 18 normally rests on its seat 16, as shown in Fig. 1. A supporting means 20 is provided for the ball 19 and may be in the form of a plate member or disc having a central aperture to provide a seat for the ball. The inner wall of the body 1 may be provided with an upwardly facing annular shoulder 21 for supporting the plate 20, which plate preferably has a plurality of spaced, radially disposed extended portions, or tabs 22, for seating on the shoulder 21 so as to provide passageways 23 between the tabs for the passage of air. The supporting plate 20 is preferably located so as to support the ball valve member 19 in spaced relation to its seat and which is the normal position of the ball. The supporting plate 20 may be press fitted to the inner wall of the body 1, or otherwise suitably secured thereto. Preferably the opening in the plate 20 is only sufficiently large enough to cause the ball to seat and come to rest so that only a small portion of the ball 19 projects below the plate to eliminate any danger of the ball sticking to its supporting seat. Also, the diameter of the inner wall of the body 1 surrounding the ball 19 is preferably only slightly larger than the diameter of the ball, in order to prevent the ball from coming to rest in any other position except on its seat. The thickness of the seat member 10, the diameter of port 12 and the diameters of the ball valve members 18 and 19 are made such that both balls cannot seat at the same time. If both of the ball valve members 18 and 19 were permitted to seat at the same time, a vacuum would be created in port 12 between the balls and as a result they would stick to their seats.

Figure 4:
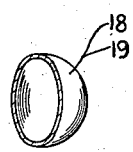
Fig. 4 is a detailed view of one of the valve members employed in my valve structure.

The ball valve member 19 is constructed of a relatively light weight material, such as aluminum, and is constructed hollow, as shown in Fig. 4, and has a lower specific gravity than water so that it will float, the purpose of which is hereafter described. The other ball valve member, or ball 18, is also constructed of a relatively light weight material, which may be aluminum, and this ball is also preferably constructed hollow so that it can be made relatively larger than a solid ball and still efficiently control the port 12 which can thus be correspondingly larger and therefore have a larger capacity for the passage of air. Air entering the body will pass through the openings 23 in the supporting plate 20, which openings reduced the resistance to the flow of the air and prevent the unseating of the ball 19 thereby. The air then acts on the exposed surface of ball 18 and lifts the ball sufficiently from its seat to permit the passage of air between the ball and its seat.

In the top wall of the cap 13 there is provided a centrally disposed aperture for receiving a supporting member 25 which extends therethrough and has an annular shoulder 26 for abutment with the inner top wall of the cap 13. The supporting member 25 has a portion 27 of reduced diameter which projects exteriorly of the cap 13 and which is externally threaded for receiving a nut 28 by means of which the supporting member 25 may be clamped to the cap 13. Carried by the supporting member 25, and within cap 13, there is a thermostatic power element which operates, when heated by the heat conveying medium, to urge the ball 18 against its seat to prevent the passage of the heat conveying medium through port 12. The thermostatic power element includes an expansible-collapsible element 30 which may be a substantially cylindrical, circumferentially corrugated, resilient metallic bellows. The upper end of the bellows 30 is hermetically secured and sealed to an end wall member or plate 31, which plate has a centrally disposed aperture for receiving an end portion of the supporting member 25, and which end portion may be peened over to secure the plate 31 thereto. The lower and free end of the bellows 30 is secured and hermetically sealed to a wall member 32 which is movable by the bellows and which has a cup-shaped portion 33 centrally thereof and which extends partway into the bellows. The end wall of the cup-shaped portion 33 has an aperture for receiving a bearing member 34 which is carried thereby, the opposite end portions 35 and 36 of which extend on either side of the end wall. The portion 35 is in axial alignment with the valve port 12 and engages the ball 18, upon sufficient expansion of the bellows 30 to press the ball against its seat 16, while the portion 36 acts as a stop and engages the end wall of the supporting member 25 to limit compression movement of the bellows 30 and to space the bearing member 35 a suitable distance from the ball. The cup-shaped portion 33 is in axial alignment with the ball 18 for receiving the same, and in the maximum compressed position of the bellows permitted by the stop means, which position is shown in Fig. 1, the cup-shaped portion 33 surrounds a portion of the ball to prevent undue side movement of the same and to prevent it from coming to rest in any position other than on its seat 16.

The bellows 30 is preferably charged with a volatile fluid, expansible and contractible in response to changes in temperature, and which fluid may consist of a solution of alcohol and water, or any other fluid suitable for the purpose. The supporting member 25 may be provided with a centrally disposed bore 37 therethrough and through which the volatile fluid may be introduced into the bellows 30. The volatile fluid may be introduced into bore 37 through a tube or conduit 38 connected thereto which, after the proper amount of volatile fluid has been introduced into the bellows, may be cutoff and flattened to prevent the escape of the fluid while a sealing material, such as solder, is applied to the end of the conduit. In the end of the stop member 36 there is provided a cross-slot 40 which aligns with the bore 37 and which permits introduction of the volatile fluid into the bellows 30. A plurality of apertures 41 are provided in the cap 13, preferably in the top wall thereof, and which constitutes the vent ports for the egress of air from the interior of cap 13. Preferably six or more of these vent ports are provided so as to have a large capacity for the flow of air therethrough.

The operation of my air vent valve in connection with a heating system is as follows: My air vent valve is particularly suitable for location in the return line from the heat radiating units because of its large capacity for the egress of air, but may be located at any other point desired in the line. It will be understood that although, in the following description of its operation, I describe my air vent valve in connection with a heating system employing steam, it may also be employed in systems using other heat conveying mediums. When the temperature of the heat conveying medium in a heating system decreases, the volatile fluid in the bellows 30 contracts and permits the bellows to compress and upon a sufficient decrease in the temperature of the heating medium, the bellows will compress until the member 36 engages the end of the supporting member 25, as shown in Fig. 1. When the pressure of the steam is again raised, any air which may be in the line will be forced therethrough ahead of the steam and because of the large capacity of my air vent valve for the egress of air, and therefore its relatively low resistance to the passage of air therethrough, the air will flow to the vent valve. The air enters the passage 2 of the valve and flows through the apertures in the ball supporting plate 29 and then acts on the exposed surface of ball 18, and by reason of its force, lifts the ball 18 off its seat and escapes into the cap 13 from whence it passes through the ports 41 to the atmosphere.

If there should happen to be water in the line which might be present due to the prior condensation of steam in the line, the water will be forced through the line by the pressure of the steam and will enter the chamber or passageway 2 of the valve body. The ball 19, having a lower specific gravity than water, will float and rising will seat against its seat 17 and thus close port 12 to prevent the passage of the water therethrough. The pressure of the water acting on the surface of the ball 19 will press the ball tightly against its seat and because of the resiliency of the seat member 10, the ball will make a tight connection therewith.

As the heat conveying medium, or steam, begins to heat the volatile fluid in the bellows 30, the fluid expands and in doing so expands the bellows, the movable wall of the bellows being moved toward the ball 18. Upon increase in the effective temperature of the steam on the volatile fluid in the bellows, the bellows will be expanded and the member 35 will engage the ball 18 and the ball will be pressed tightly against its seat 16 to close port 12 to prevent the passage of the steam therethrough. Because of the resiliency of the seat member 10, the ball can be pressed tightly thereagainst and will make a good seal with its seat 16. As previously stated, both of the ball valve members 18 and 19 can not be seated at the same time because of the relative sizes of the seat member thickness, the size of port 12 and the diameter of the balls. As a result, if there should happen to be water in the body 1 so that the ball 19 is seated and the ball 18 is pressed against its seat by the thermostatic element, then the ball 19 will be moved off its seat by engagement of ball 18, which will then serve to prevent the passage of water, as well as the steam, through the port 12. The water in the body 1 and in the line will be vaporized by the heat of the steam.

When the system cools there is a partial vacuum created in the valve body 1, and since the air in the cap 13 is at atmospheric pressure, the ball is held tightly against its seat by the pressure differential and the air in the cap is prevented from entering the line so that the valve functions as a so called vacuum type of valve.

Figure 2:
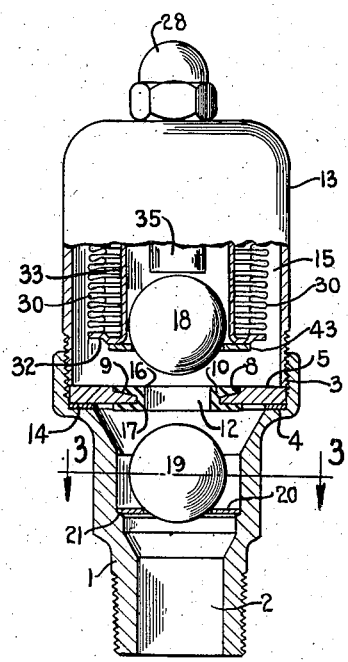
Fig. 2 is a view of a modified form of my vent valve.
Figure 3:
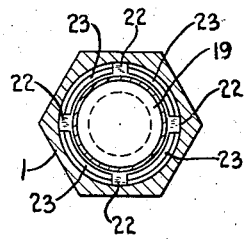
Fig. 3 is a view shown in cross-section taken along the line 3—3 of Figs. 1 and 2.

Referring now to my modified form of air vent valve shown in Fig. 2, this structure is substantially the same as that of Fig. 1 except that it is of the non-vacuum type and instead of preventing the return of air to the line, has provision for permitting its return. To this end, the lower end of the movable wall means 32 is provided with a supporting member 43 for the ball 18, and which supporting member may be a flat, ring-like plate member which may be welded or otherwise suitably secured to the movable wall means. The plate 43 has a centrally disposed opening providing a seat for the ball 18, the larger portion of the ball being disposed within the cup-shaped portion 33. The opening in the plate is preferably larger than the diameter of the port 12 so that the ball 18 will seat on the resilient seat member 10, to close the port. As in the previously described valve of Fig. 1, the ball 19 floats to prevent the passage of water through port 12 while the ball 18, under the force exerted by the thermostatic power element, closes the port 12 to the passage of steam therethrough. When the heating system cools, the bellows 30 will contract and in so doing will lift the ball 18 from its seat, whereby air will flow through port 12 and into the line of the heating system. Preferably there is a slight clearance between the ball and the member 35 to permit the ball 18 to rotate on its supporting member 43 and thereby be self-cleaning.

What I claim and desire to secure by Letters Patent of the United States is:

1. An air vent valve for a heating system comprising a casing having an inlet for connection in the line of a heating system and having an outlet for the egress of air, a valve seat member in said casing between said inlet and said outlet and having a passage therethrough for air, said valve seat member having oppositely disposed valve seats defining ports, a valve member cooperable with one of said seats for closing the port defined thereby to the passage of the heat conveying medium, a valve member cooperable with the other of said valve seats for preventing the passage of water from the line through said passage, said valve seat member being resilient to obtain a tight closing of one of said ports, only one of said valve members being seatable at the same time so as to prevent the establishing of a vacuum therebetween in said valve port, and a thermostatic power element in said casing and operable when heated by the heat conveying medium for urging said first-named valve member against its seat.

2. In a vent valve for a heating system, a body portion having an inlet for connection in the line of a heating system, a cap closing one end of said body and having an outlet for the egress of air therefrom, a valve seat member between said inlet and said outlet and having a port for the passage of air therethrough, a valve member for controlling said port and normally positioned to permit the passage of air through said port, a thermostatic power element within said cap and operable in response to the temperature of the heat conveying medium for urging said valve member against its seat to prevent the passage through said port of the heat conveying medium, said thermostatic power element comprising a bellows member charged with an expansible-contractible fluid, and a supporting member mounted on said cap and supporting said thermostatic power element, said supporting member having a passage therethrough for introducing an expansible-contractible fluid into the bellows member, said bellows member having a movable end wall, said movable end wall on expansion of said bellows member engaging said valve member and engaging with said supporting member upon contraction of said bellows member to space the said movable wall a predetermined distance from said valve seat member.

3. An air vent valve for a heating system comprising a casing having an inlet for connection in the line of a heating system and having an outlet for the egress of air therefrom, a resilient valve seat member in said casing between the said inlet and outlet and having a port therethrough for the passage of air from the line to said outlet, a hollow spherical valve member on the inlet side of said valve seat member for controlling said port, said spherical valve member being loosely disposed and floatable in water to close said port to prevent the passage of water therethrough, a second hollow spherical valve member loosely disposed on the outlet side of said valve seat member and normally seating thereon and closing said port, said second-named spherical valve member being movable in one direction by the pressure of the air stream acting thereagainst to permit the passage of the air through said port for egress from said outlet, a thermostatic element in said casing and operable when heated by the heat conveying medium for urging said second-named spherical valve member against its seat to close said port to the passage of the heat conveying medium therethrough, and a guide means movable relative to said second-named valve member and carried by said thermostatic element for restricting side movement of said second-named loosely disposed valve member.

4. An air vent valve for a heating system comprising a casing having an inlet for connection in the line of a heating system and having an outlet for the egress of air, a valve seat supporting member within said casing between said inlet and outlet, a resilient valve seat member molded to said supporting member and having a port therethrough for the passage of air from the line for egress through said outlet, said resilient seat member having a valve seat on each side thereof, a hollow metallic ball valve on the outlet side of said seat member and normally resting on its seat and closing said port, said ball being loosely disposed in said casing and being movable from its seat by the pressure of the air stream to permit the passage of the air through said port, a thermostatic element in said casing and having a movable member carried thereby and normally spaced from said ball valve, said movable member being movable into engagement with said ball valve upon heating of said thermostatic element by the heat conveying medium for urging said valve against its seat to prevent the passage of the heat conveying medium through said port, and a second hollow metallic ball valve for cooperating with said other valve seat and floatable in water against its seat to prevent the passage of water through said port.

5. An air vent valve for a heating system comprising, a casing having an internal wall having an aperture therethrough and having oppositely disposed valve seats, said casing having an inlet on one side of said wall for connection to the heating system and having an outlet for the egress of air on the other side of said wall, a valve member on one side of said wall and cooperable with one of said seats to control flow through said aperture, said valve member on seating projecting into said aperture, thermostatic means for actuating said valve member, a float valve member on the other side of said wall and cooperable with the other of said seats for controlling flow through said aperture, said float valve member on seating projecting into said aperture, said float valve member being operable to close said aperture when a predetermined quantity of water from said heating system flows into said casing, said valve seats being resilient to obtain tight fits with said valve members, one of said valve members being moved away from its seat on predetermined movement of the other of said valve members toward its seat to prevent both of said valve members from being seated at the same time.

6. In an air vent valve for a heating system, a casing having an inlet for connection in the line of a heating system and having an outlet for the egress of air therefrom, said casing also having a substantially horizontally disposed internal wall between the inlet and outlet, said wall having an aperture therethrough and oppositely disposed valve seats, a thermostatic power element disposed in said casing above said wall, said power element having a housing portion movable toward and away from said wall in accordance with the temperature of said power element, a valve member loosely disposed in and carried by said housing portion and cooperable with one of said seats to close said aperture, said housing portion having a wall provided with an aperture therein and a seat for said valve member, said valve member projecting through said last-named aperture for engaging said one seat, said power element having an abutment in said housing portion spaced from said valve member when said housing portion is moved away from said internal wall and engageable with said valve member to press the same tightly against said first-named seat when said thermostatic power element is heated to a predetermined temperature, said housing portion being movable a predetermined distance before engagement of said second-named seat with said valve member on cooling of said power element so that said valve member will not be moved from said first-named seat on initial movement of said housing portion, a float valve disposed in said casing below said internal wall and cooperable with the other of said first-named seats to prevent flow of water through said first-named aperture, said valve members being engageable through said first-named aperture so that both of said valve members can not seat at the same time.

LEWIS W. EGGLESTON.